US012810224B2

(12) United States Patent
Singh et al.

(10) Patent No.: US 12,810,224 B2
(45) Date of Patent: Nov. 24, 2026

(54) ORCHESTRATE EVENTS IN DISTRIBUTED DEVOPS APPARATUS LEVERAGING GENERATIVE AI

(71) Applicant: Bank of America Corporation, Charlotte, NC (US)

(72) Inventors: Shailendra Singh, Maharashtra (IN); Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 18/402,254

(22) Filed: Jan. 2, 2024

(65) Prior Publication Data

US 2025/0217740 A1 Jul. 3, 2025

(51) Int. Cl.
*G06Q 10/0631* (2023.01)
*G06F 11/3668* (2025.01)

(52) U.S. Cl.
CPC ... *G06Q 10/06316* (2013.01); *G06F 11/3668* (2013.01)

(58) Field of Classification Search
CPC .............. G06Q 10/06; G06Q 10/06316; G06F 11/3668; G06F 11/3698
See application file for complete search history.

(56) References Cited

U.S. PATENT DOCUMENTS 9,256,806 B2 2/2016 Aller et al.
9,916,519 B2 3/2018 Rodriguez et al.
10,646,156 B1 5/2020 Schnorr
11,045,271 B1 6/2021 Tran
11,475,536 B2 10/2022 Liu et al.
11,501,152 B2 11/2022 Yehezkel Rohekar et al.
(Continued)

FOREIGN PATENT DOCUMENTS

DE 112020001663 T5 3/2022
EP 2559030 B1 6/2017
(Continued)

OTHER PUBLICATIONS

E. Di Nitto et al., "An Approach to Support Automated Deployment of Applications on Heterogeneous Cloud-HPC Infrastructures," 2020 22nd International Symposium on Symbolic and Numeric Algorithms for Scientific Computing (SYNASC), Timisoara, Romania , 2020, pp. 133-140.*
(Continued)

*Primary Examiner* — Timothy Padot
(74) *Attorney, Agent, or Firm* — Banner & Witcoff, Ltd.

(57) ABSTRACT

Systems and methods for orchestrating events in distributed DevOps apparatus leveraging generative AI are disclosed to automate and streamline software development and deployment in distributed DevOps environments using Generative Adversarial Networks (GANs) and other AI techniques. The method involves interpreting UML diagrams, design documents, or the like with generative AI and computer vision to create DevOps tasks, integrating with various DevOps tools for task management, and deploying generated rules for automated event execution. Metadata is generated and processed in order to facilitate AI analysis. The systems and methods reduce manual intervention, increase efficiency, and improve accuracy, scalability, security, and compliance in DevOps workflows.

17 Claims, 4 Drawing Sheets

(56) References Cited

U.S. PATENT DOCUMENTS

| | | | | |
|---|---|---|---|---|
| 2011/0061041 | A1* | 3/2011 | Hellebro | G06F 8/70 717/120 |
| 2016/0283201 | A1* | 9/2016 | Wang | G06F 11/3604 |
| 2019/0129405 | A1 | 5/2019 | Cella et al. | |
| 2019/0139191 | A1* | 5/2019 | Liu | G06F 18/2155 |
| 2019/0171438 | A1* | 6/2019 | Franchitti | G06F 16/903 |
| 2019/0258953 | A1* | 8/2019 | Lang | G06N 20/00 |
| 2020/0320769 | A1 | 10/2020 | Chen et al. | |
| 2020/0395117 | A1 | 12/2020 | Schnorr | |
| 2021/0019674 | A1 | 1/2021 | Crabtree et al. | |
| 2021/0097691 | A1 | 4/2021 | Liu | |
| 2021/0112154 | A1 | 4/2021 | Rodriguez et al. | |
| 2021/0173638 | A1* | 6/2021 | Jia | G06F 8/33 |
| 2022/0130272 | A1* | 4/2022 | Foroughi | G09B 7/00 |
| 2022/0309762 | A1 | 9/2022 | Zhao et al. | |
| 2023/0351102 | A1 | 11/2023 | Tran | |
| 2024/0160418 | A1* | 5/2024 | Srivastava | G06F 8/34 |

FOREIGN PATENT DOCUMENTS

| | | | |
|---|---|---|---|
| WO | 2021077140 | A2 | 4/2021 |
| WO | 2023069085 | A1 | 4/2023 |

OTHER PUBLICATIONS

Y. L.Gamage, "Automated software architecture diagram generator using natural language processing," BSc dissertation, Dept. Computer Sci Univ. of Westminster, UK, May 2023.*

Guru Charan Kakaraparthi. Building a GenAI-Powered Advanced Code Generation Assistant Integrated with CI/CD Pipelines. Technix International Journal for Engineering Research 9(2):56-63. Feb. 2022. vol. 9, Issue 2.*

* cited by examiner

ORCHESTRATE EVENTS IN DISTRIBUTED DEVOPS APPARATUS LEVERAGING GENERATIVE AI

TECHNICAL FIELD

The present disclosure relates to data processing-artificial intelligence (AI) and, more particularly, AI-assisted DevOps automation leveraging generative AI and image recognition to automate event generation and orchestration in distributed DevOps environments.

DESCRIPTION OF THE RELATED ART

Distributed DevOps refers to the application of DevOps principles and practices in a software development environment where teams and resources are geographically dispersed. This means development, operations, and other IT functions are not co-located but rather spread across different locations, time zones, and even organizations.

Streamlining is crucial for efficient and rapid software development and deployment. Current distributed DevOps pipelines rely heavily on manual intervention at various stages, leading to: (a) Bottlenecks: Manual steps slow down the development process, hindering efficiency and speed; (b) Errors: Increased risk of human errors introducing bugs and security vulnerabilities; and (c) Inconsistent Workflow: Manual steps can lead to inconsistencies in the DevOps pipeline, making it harder to manage and scale. The challenge is to identify ways to reduce or eliminate manual intervention while ensuring the integrity and security of the pipeline.

Stages affected include: (a) Task Management: Manual assignment and tracking of tasks can lead to miscommunication and inefficiencies; (b) Task Creation: Manually creating tasks for each step introduces redundancy and potential for errors; (c) Agile Data Creation: Manual creation of data for agile ceremonies can be time-consuming and error-prone; (d) Environments Ticket Creation: Manual creation of tickets for managing various environments is inefficient and prone to errors; (e) Prod Environment Readiness: Manually checking and preparing production environments consumes time and resources; and (f) Prod Installation Task Creation: Manually creating tasks for installing software in production is repetitive and error-prone.

Hence there is need to develop intelligent event orchestration systems and methods to automatically orchestrates events in distributed DevOps pipelines, eliminating manual intervention and its associated drawbacks. By automating tasks and eliminating error-prone manual steps, organizations can significantly improve their DevOps efficiency and overall software delivery performance. There is a need to be able to accomplish the foregoing based on Unified Modeling Language (UML) diagrams, design diagrams, and corresponding metadata.

SUMMARY OF THE INVENTION

In accordance with one or more arrangements of the non-limiting sample disclosures contained herein, solutions are provided to address one or more issues by targeting distributed DevOps technology to automate and streamline software development and deployment. It involves an intelligent process that uses generative AI and computer vision to interpret UML diagrams and create DevOps tasks, thus reducing manual setup and coordination. The system integrates with various DevOps tools, generating and orchestrating tasks like code merging, environment setup, and access provisioning. This approach aims to transition from manual, error-prone methods to a more efficient, automated workflow, accommodating the evolving nature of distributed, collaborative development.

This is accomplished by providing, inter alia, an intelligent method leveraging Generative Adversarial Networks (GANs) to automatically generate and orchestrate events in distributed DevOps environments by, for example, utilizing: (a) Generative AI: GANs analyze UML diagrams and design documents to understand context and generate new DevOps event task rules; (b) Image Recognition: Extracts relevant information from UML diagrams for context analysis; (c) Context Mapping Engine: Maps extracted context to specific DevOps event tasks; (d) Auto-Integration: Integrates seamlessly with existing DevOps tools for task creation and management; (e) Dependency Analysis: Analyzes dependencies between tasks for efficient orchestration; (f) Meta-Learning: GANs continuously learn and improve the quality of generated event task rules over time; and/or (g) Deployment: Generated rules are deployed to multiple DevOps tools for automated event execution.

Benefits of the disclosures contained herein include: (a) Reduced Manual Intervention: Eliminates manual task creation and orchestration, increasing efficiency; (b) Faster Development Cycles: Automates repetitive tasks and streamlines workflows; (c) Improved Accuracy: GANs generate valid and relevant event task rules based on context; (d) Scalability: Adapts to changing needs and complexity of DevOps environments; and (e) Enhanced Security and Compliance: Automated workflows reduce the risk of human error and improve compliance.

The inventions disclosed herein present novel and innovative approaches to automating event orchestration in distributed DevOps environments, offering significant advantages over existing methods.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a system for automating task orchestration in DevOps environments can include one or more of the following. A Unified Modeling Language (UML) Diagram Metadata Extraction Engine can be configured to analyze UML diagrams and extract metadata, wherein the metadata includes information related to system design, components, and relationships. A Design Context Analyzer Engine can be connected to the UML Diagram Metadata Extraction Engine, configured to interpret the context of the extracted metadata to understand system architecture and operational workflows. A DevOps Event- Task Dependency Analyzer Engine can analyze dependencies between various tasks within the DevOps workflow, configured to identify sequential and parallel task relationships and potential bottlenecks. A DevOps Event-Task-Rule Mapping Engine can map the analyzed metadata and dependencies to specific event-driven tasks, configured to generate rules dictating when and how tasks should be executed in response to certain events or conditions. A DevOps Event-Task-Rule Validation Engine can validate the accuracy and feasibility of the generated task rules, ensuring that they are executable within the defined DevOps environment. A DevOps Event-Task-Rule Orchestration Engine can implement and manage the workflow of the validated tasks according to the defined rules and dependencies, ensuring efficient and coordinated execution of tasks. A Generative AI & GAN (Generative Adversarial Network) Engine, coupled with the aforementioned engines, can generate new rules or optimizing existing ones based on ongoing learning from the execution of DevOps tasks and workflow outcomes. Integration with DevOps Tools can be provided for seamless task execution and management, wherein the tools can include, but are not limited to, issue tracking, version control, continuous integration, and deployment tools. A Development Environment can be configured to be automatically set up and managed by the orchestration engine, based on the requirements derived from the UML diagrams and task rules, facilitating the development phase of software projects. A Testing Environment also can be configured to be automatically established and managed, equipped with tools and resources for executing a suite of automated tests as dictated by the DevOps tasks and workflow requirements, ensuring that the software meets quality standards before deployment.

In some arrangements, a method can automate event orchestration in distributed DevOps environments by performing one or more of the following steps: 1. Utilization of Generative Adversarial Networks (GANs): The method involves the use of GANs to interpret Unified Modeling Language (UML) diagrams. These GANs are instrumental in generating rules for DevOps event tasks. Notably, the GANs are not static; they are continuously updated based on feedback received from the execution of tasks they have generated. This continuous learning process is critical for enhancing the accuracy of rule generation. Furthermore, these GANs are adept at creating predictive models, which are crucial for simulating the potential impacts of proposed DevOps tasks. 2. Employment of Image Recognition and Natural Language Processing Techniques: A key component of the method is the use of advanced image recognition, supplemented by natural language processing techniques. This combination is effective in extracting relevant information from UML diagrams. The process is sophisticated enough to handle different types of UML diagrams, including both structural and behavioral diagrams, and is also capable of processing diagrams in multiple languages. 3. Mapping Extracted Information to DevOps Tasks: The information extracted from UML diagrams is then mapped to specific DevOps event tasks. This mapping is conducted by a context mapping engine, which leverages historical data from previous DevOps tasks and incorporates feedback loop mechanisms. This approach not only enhances the accuracy of task mapping but also refines the process of generating and mapping future tasks. 4. Integration with Existing DevOps Tools: The generated tasks are integrated with existing DevOps tools, streamlining the process of task creation and management. This integration includes setting up automated testing environments and configuring environments for both production and development. Additionally, the method involves deploying these tasks across multiple DevOps tools for automated execution. An automated notification system is also part of this integration, keeping stakeholders updated about the status of tasks and any changes in the workflow. 5. Analysis of Task Dependencies: To optimize the sequencing of tasks and allocation of resources, the method includes an analysis of dependencies between tasks. This analysis is pivotal in ensuring efficient workflow and resource management. Moreover, resources are automatically scaled based on the complexity and demands of the tasks generated. 6. Real-Time Monitoring and Workflow Adjustment: The method also encompasses real-time monitoring of DevOps workflows. This monitoring enables the adjustment of workflows based on the tasks generated, ensuring ongoing optimization and responsiveness. 7. Customization of Generated Tasks: The generated tasks are not one-size-fits-all; they are customizable based on specific project requirements. This customization ensures that the tasks are aligned with the unique needs of each project. 8. Implementation on a Cloud-Based Platform: To facilitate collaboration among distributed DevOps teams, the method is implemented on a cloud-based platform. This implementation provides seamless integration and coordination across geographically dispersed teams. 9. Employment of Meta-Learning Techniques: The method utilizes meta-learning techniques, enabling the GANs to adapt to evolving practices and technologies in the field of DevOps. This adaptability is key to keeping the orchestration method relevant and effective in a rapidly changing technological landscape. 10. Security and Compliance Checks: Each generated DevOps task undergoes a thorough security and compliance check, ensuring that the tasks adhere to the required standards and protocols. 11. Generation of Documentation: For each task generated and workflow established, the method includes generating comprehensive documentation. This documentation serves as a valuable reference and record of the tasks and workflows implemented. In summary, the method automates event orchestration in distributed DevOps environments and is characterized by its use of advanced AI techniques, integration with existing tools, and emphasis on customization, security, and adaptability.

In some arrangements, a method for automating event orchestration in distributed DevOps environments can include one or more of the following steps. 1. Utilizing Generative Adversarial Networks (GANs) to interpret Unified Modeling Language (UML) diagrams for generating DevOps event task rules, wherein the GANs are continuously updated based on feedback from the execution of generated tasks to improve rule generation accuracy and are configured to generate predictive models for simulating the impact of proposed DevOps tasks. 2. Employing image recognition, including natural language processing techniques, to extract relevant information from said UML diagrams, wherein the image recognition process is adapted to recognize and interpret various types of UML diagrams, including structural and behavioral diagrams, and is capable of handling multi-language UML diagrams. 3. Mapping the extracted information to specific DevOps event tasks using a context mapping engine that utilizes historical data from previous DevOps tasks and feedback loop mechanisms to enhance task mapping accuracy and to refine future task generation and mapping. 4. Integrating the generated tasks with existing DevOps tools for automated task creation and management, including configuring automated testing environments and automated environment setup for production and development, wherein the integration includes a step of deploying the generated tasks across multiple DevOps tools for automated event execution and includes an automated notification system for updating stakeholders about task status and workflow changes. 5. Analyzing dependencies between tasks to optimize task sequencing and resource allocation, and automatically scaling resources based on the complexity and demands of the generated tasks. 6. Implementing real-time monitoring and adjustment of DevOps workflows based on generated event tasks. 7. Customizing the generated DevOps tasks based on specific project requirements. 8. Implementing the method on a cloud-based platform to facilitate distributed DevOps team collaboration. 9. Employing meta-learning techniques to enable the GANs to adapt to evolving DevOps practices and technologies. 9. Conducting a security and compliance check for each generated DevOps task. 10. Generating documentation for each generated task and workflow.

In some arrangements, a system and process for automating task orchestration in distributed DevOps environments using Generative Adversarial Networks (GANs), can include: (a) Input modules for UML Diagrams (Structural, Behavioral, Other) and Design Diagrams; an AI Diagram Metadata Generator for processing these diagrams and generating comprehensive metadata; (c) An AI Metadata Parser for extracting and structuring data fields from the metadata; (d) An AI Generative DevOps Event-Task-Rules Engine for creating tasks, rules, and CI/CD pipeline components based on the parsed metadata; and (e) Deployment modules where the orchestrated events are implemented in distributed DevOps environments.

In some arrangements, an AI-driven process for managing a Continuous Integration (CI) and Continuous Deployment (CD) workflow in a DevOps environment, leveraging AI and GANs, can include: (a) Steps for selecting main and feature branches in a version control system; (b) The creation of CI/CD pipeline rules and automated testing tasks; (c) Automated validation and notification setup for build statuses and test results; (d) Processes for merging to the main branch and resolving merge conflicts; and (e) An auto-delete feature for obsolete CI branches post-merger.

In some arrangements, systems or methods can create and manage rules for event-driven tasks within a DevOps environment, integrating with various DevOps tools, by utilizing one or more of: (a) UML Diagram Metadata Extraction Engine for analyzing and extracting metadata from UML diagrams; (b) Design Context-Analyzer Engine for interpreting the context of the design from metadata; (c) DevOps Event-Task Dependency Analyzer Engine for analyzing task dependencies; (d) DevOps Event-Task-Rule Mapping Engine for defining rules for task triggers; (e) Validation and Orchestration Engines for validating and automating the execution of tasks; (f) Generative AI & GAN Engine for rule generation and optimization; (g) Integration with various DevOps tools and development/testing environments.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

Additional arrangements, methods, systems, and combinations of the foregoing are described and disclosed infra.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
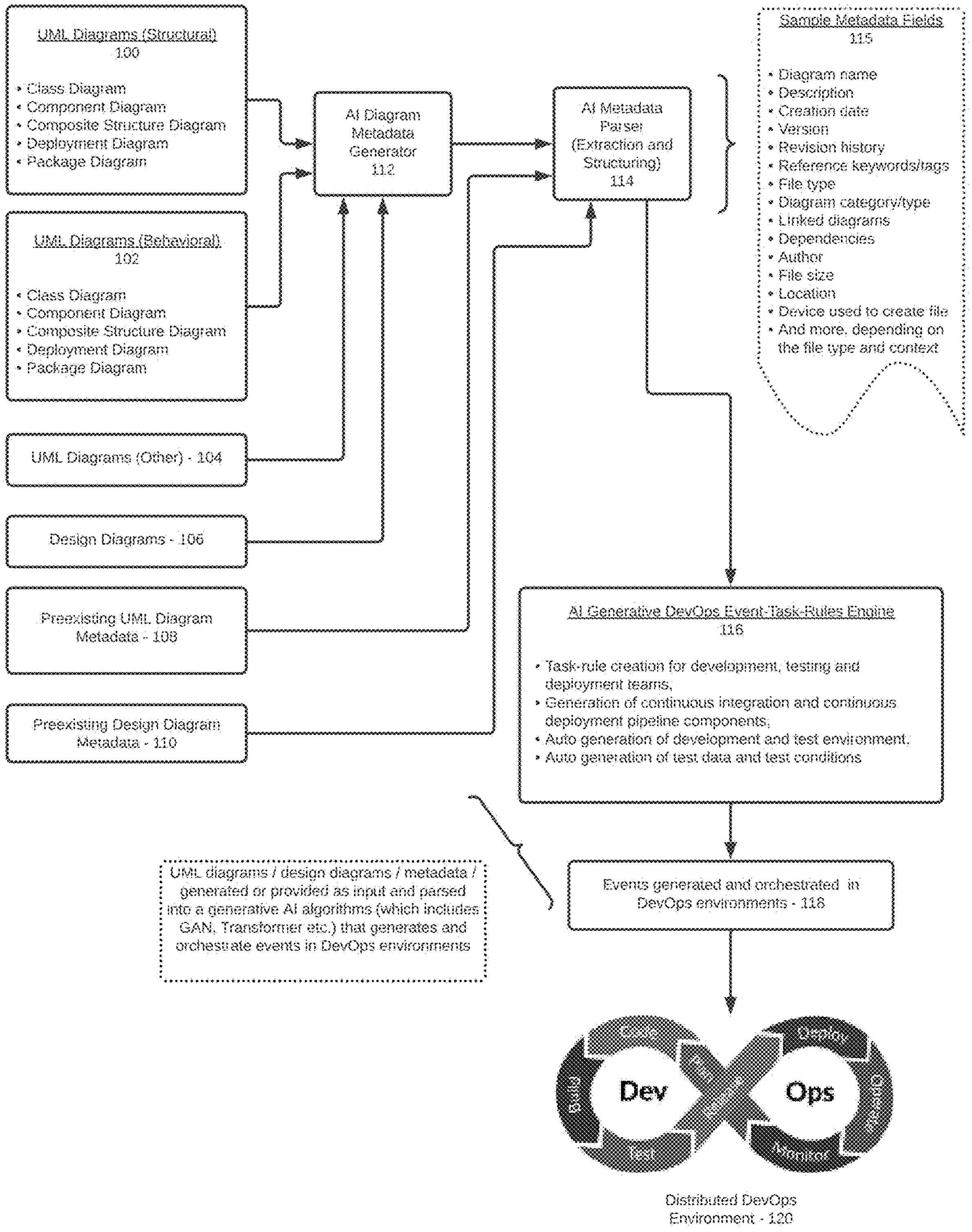
FIG. 1 depicts a functional concept diagram showing sample interactions, interfaces, steps, functions, and components of a system and process to automate task orchestration in distributed DevOps environments using Generative Adversarial Networks (GANs) in accordance with one or more aspects of this disclosure.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), quantum circuits, quantum computing, servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting disclosure, FIG. 1 depicts a functional concept diagram showing sample interactions, interfaces, steps, functions, and components of a system and process to automate task orchestration in distributed DevOps environments using Generative Adversarial Networks (GANs) in accordance with one or more aspects of this disclosure.

At a high level, this is a functional concept diagram illustrating a system and process for automating task orchestration in distributed DevOps environments using Generative Adversarial Networks (GANs), comprising: (a) Input modules for UML Diagrams (Structural, Behavioral, Other) and Design Diagrams; (b) An AI Diagram Metadata Generator for processing these diagrams and generating comprehensive metadata; (c) An AI Metadata Parser for extracting and structuring data fields from the metadata; (d) An AI Generative DevOps Event-Task-Rules Engine for creating tasks, rules, and CI/CD pipeline components based on the parsed metadata; and (e) Deployment modules where the orchestrated events are implemented in distributed DevOps environments.

FIG. 1 provides process flow for an AI-driven DevOps event-task-rules engine. It begins with UML Diagrams (Structural) 100, UML Diagrams (Behavioral) 102, UML Diagrams (Other) 104, or any other Design Diagrams 106 that are feed into an AI Diagram Metadata Generator 112. Any types of UML diagram, design diagram, or the like can be used as source material for the disclosed systems and processes.

The AI diagram metadata generator 112 harnesses artificial intelligence to automatically create metadata for visual diagrams. It streamlines the process of cataloging, organizing, and utilizing diagrams effectively, offering several key advantages.

One is diagram analysis. The AI examines the visual elements of a diagram, including shapes, text, connectors, and spatial relationships. It applies image recognition and natural language processing techniques to extract meaningful information.

Another is metadata generation. The tool generates a comprehensive set of metadata, typically covering, inter alia: diagram title, author, creation date, description, keywords, entities, and relationships depicted, data sources used, dependencies, diagram type (e.g., flowchart, mind map, UML diagram, design diagram), intended audience, version history, etc. Other metadata examples/fields are illustrated as sample metadata fields 115.

The generated metadata can be output in various formats, such as: structured data (e.g., JSON, XML), textual descriptions, embedded within the diagram file stored separately in a database or metadata repository, etc.

This metadata is then parsed by an AI Metadata Parser 114 which extracts and structures data fields like diagram name, description, creation date, (or other such as shown in 115, etc.

Parsing metadata means extracting and structuring the information embedded within metadata to make it usable for various purposes. Parsing involves analyzing and breaking down data into its components to make it understandable and usable. Parsing metadata specifically focuses on extracting the relevant information from the metadata and organizing it into a structured format.

Parsing provides benefits of: (a) Searching and Organizing Data: Metadata enables efficient search and retrieval of specific data items based on their attributes; (b) Data Analysis: It provides valuable context for understanding and interpreting data, aiding in analysis and decision-making; (c) Interoperability: Parsing metadata ensures different systems can understand and exchange data effectively; (d) Content Management: it is important for managing large volumes of data, like in digital libraries or media archives; (e) Web Analytics: to track website content performance and user behavior; (f) Data Flow Understanding: to help visualize data movement and transformations within complex systems.

Examples of Parsing Metadata include: (a) Search engines: Parsing website metadata (titles, descriptions, keywords) to index and rank pages effectively; (b) Image editing software: Reading image metadata (camera model, exposure settings, date taken) to display and organize photos; (c) Document management systems: Extracting metadata from documents (author, creation date, version history) for cataloging and retrieval; and (d) Libraries: Parsing metadata of books and other materials for cataloging and search.

The process of parsing metadata can include: (a) Accessing Metadata: Retrieve the metadata from the relevant source (file header, database, etc.); (b) Identifying Structure: Determine the format and structure of the metadata (e.g., XML, JSON, CSV); (c) Extracting Information: Use parsing techniques based on the format to extract specific metadata elements; (d) Validating Data: Ensure the parsed information is accurate and consistent; and (e) Structuring Data: Organize the extracted metadata into a usable format (e.g., data structures, objects).

If any preexisting metadata is already available for UML diagrams 108 or design diagrams 110, the AI diagram metadata generator 112 may be bypassed and the preexisting metadata may be directly provided to an AI Metadata Parser (Extraction and structuring) 114. Alternatively, the generator 112 may be used in addition to the existing preexisting metadata to provide augmented metadata.

The processed metadata is utilized by an AI Generative DevOps Event-Task-Rules Engine 116 which creates tasks and rules for development, testing, deployment teams, and generates CI/CD pipeline components. The events generated orchestrate the DevOps environment as a highly automated and integrated system for managing DevOps activities. It provides for automatic generation of development environments and test environments. It similarly provides for automatic generation of test data and test conditions.

The events then are generated and orchestrated in DevOps environments 118 for use in a distributed DevOps environment 120. Thus, UML and design diagrams, along with their metadata, are used as inputs for generative AI algorithms, including GANs and Transformers. These algorithms then generate and manage events within DevOps environments, automating and streamlining the workflow.

Figure 2:
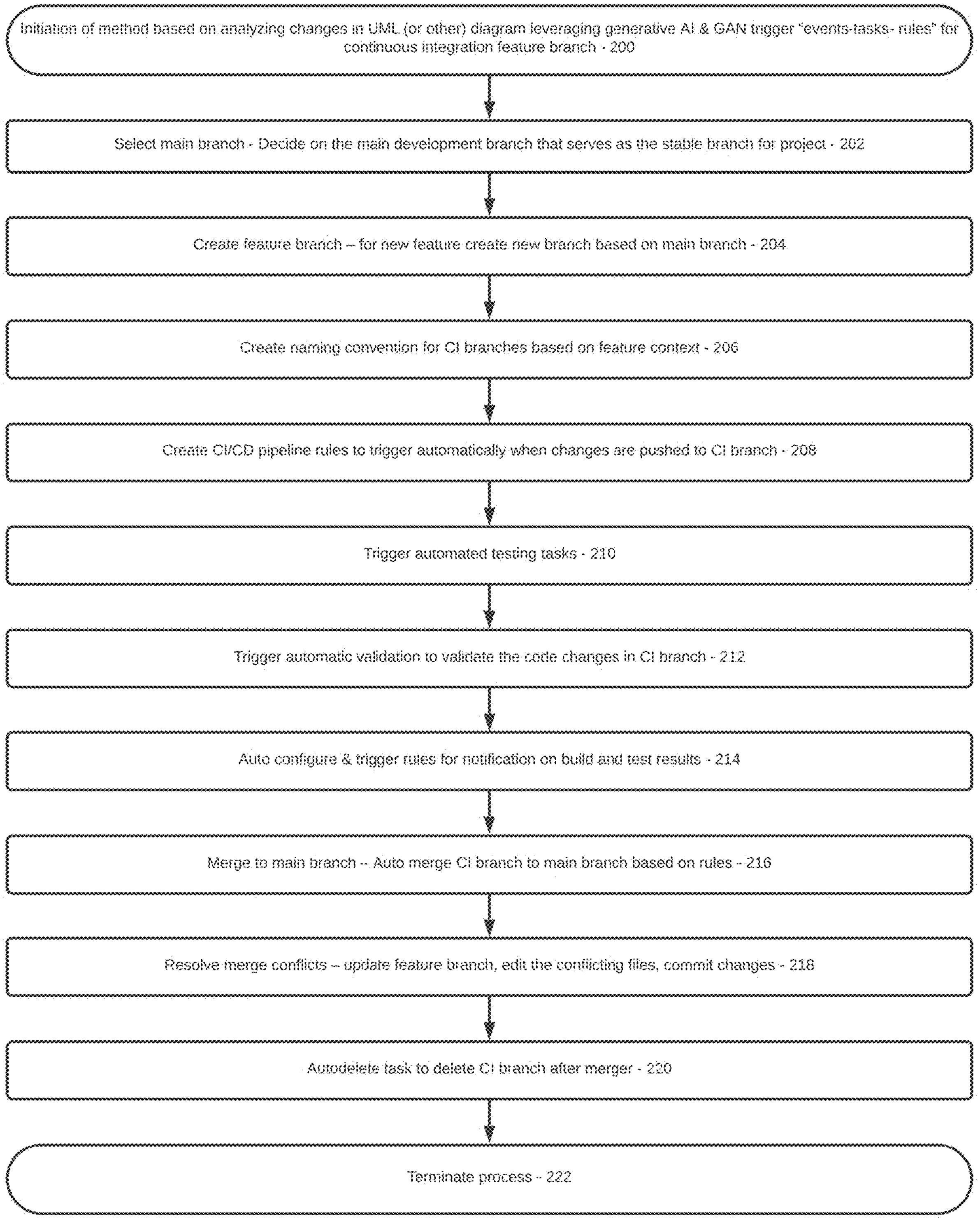
FIG. 2 depicts another functional flow diagram showing sample interactions, interfaces, steps, functions, for an example process for managing a Continuous Integration (CI) and Continuous Deployment (CD) workflow, leveraging AI and GANs, for an AI generated DevOps event in accordance with one or more aspects of this disclosure.

By way of non-limiting disclosure, FIG. 2 depicts another functional flow diagram showing sample interactions, interfaces, steps, functions, for an example process for managing a Continuous Integration (CI) and Continuous Deployment (CD) workflow, leveraging AI and GANs, for an AI generated DevOps event in accordance with one or more aspects of this disclosure.

At a high level, this is a functional flow diagram showing an AI-driven process for managing a Continuous Integration (CI) and Continuous Deployment (CD) workflow in a DevOps environment, leveraging AI and GANs, including: (a) Steps for selecting main and feature branches in a version control system; (b) The creation of CI/CD pipeline rules and automated testing tasks; (c) Automated validation and notification setup for build statuses and test results; (d) Processes for merging to the main branch and resolving merge conflicts; and (e) An auto-delete feature for obsolete CI branches post-merger.

Further, the process of FIG. 2 is a sophisticated method for managing a Continuous Integration (CI) and Continuous Deployment (CD) workflow, leveraging AI and GANs. This is aimed at automating the DevOps pipeline in response to changes detected in UML diagrams. After initiation of the process in 200, one or more of the following steps can be implemented.

The first step is to select the main branch in 202. The AI selects the primary branch in the version control system, which serves as the stable production or main development line. This branch holds the source code that reflects the current state of the product in production.

The next step is to create a feature branch in 204. When a new feature is planned, the AI creates a feature branch from the main branch. This allows developers to work on new features without disturbing the main codebase.

The next step is to create a naming convention for CI branches in 206. The AI establishes a naming convention for branches that will undergo CI. This helps in identifying the purpose of branches and organizing the workflow.

Next is creation of CI/CD pipeline rules in 208. The AI generates rules that trigger the CI/CD pipeline when changes are pushed to a CI branch. This automation ensures that any new code commits are built and tested without manual intervention.

Next is to trigger automated testing tasks in 210. As soon as the CI pipeline rules are met, automated tests are triggered to verify that the new code does not break any existing functionality.

Thereafter, automatic validation is triggered in 212. The AI validates the code changes in the CI branch to ensure they meet quality standards and do not introduce bugs.

In 214, auto-configure trigger rules for notification is performed. The system is set up to automatically send notifications about build statuses and test results, keeping the team informed.

Next is to merge to the main branch in 216. Once the code passes all checks, the AI automatically merges the CI branch back to the main branch based on pre-defined rules, ensuring a smooth integration of new features.

Next is to resolve merge conflicts in 218. If there are conflicts between the feature branch and the main branch, the AI updates the feature branch, resolves conflicts by editing files, and commits the changes.

Lastly, an autodelete task to delete CI branch is performed in 220. After the merge is successful and the feature branch has been integrated into the main branch, the AI performs cleanup by deleting the now-obsolete CI branch. The process may then continue, loop, or terminate as desired.

In various arrangements, the AI can utilize the metadata from UML diagrams to understand the structural and behavioral changes in the system, triggering appropriate DevOps events. Also, Generative AI can propose or even implement optimizations in the pipeline based on past data, learning from the outcomes of previous CI/CD runs. Further, GANs can be used to predict the impact of code changes, creating simulations to test the new features before actual code integration. The AI system can also incorporate real-time monitoring to continuously learn and improve the CI/CD process, using feedback loops to refine the rules and triggers.

This approach significantly reduces manual errors, improves efficiency, and allows for a more scalable and resilient DevOps process.

Figure 3:
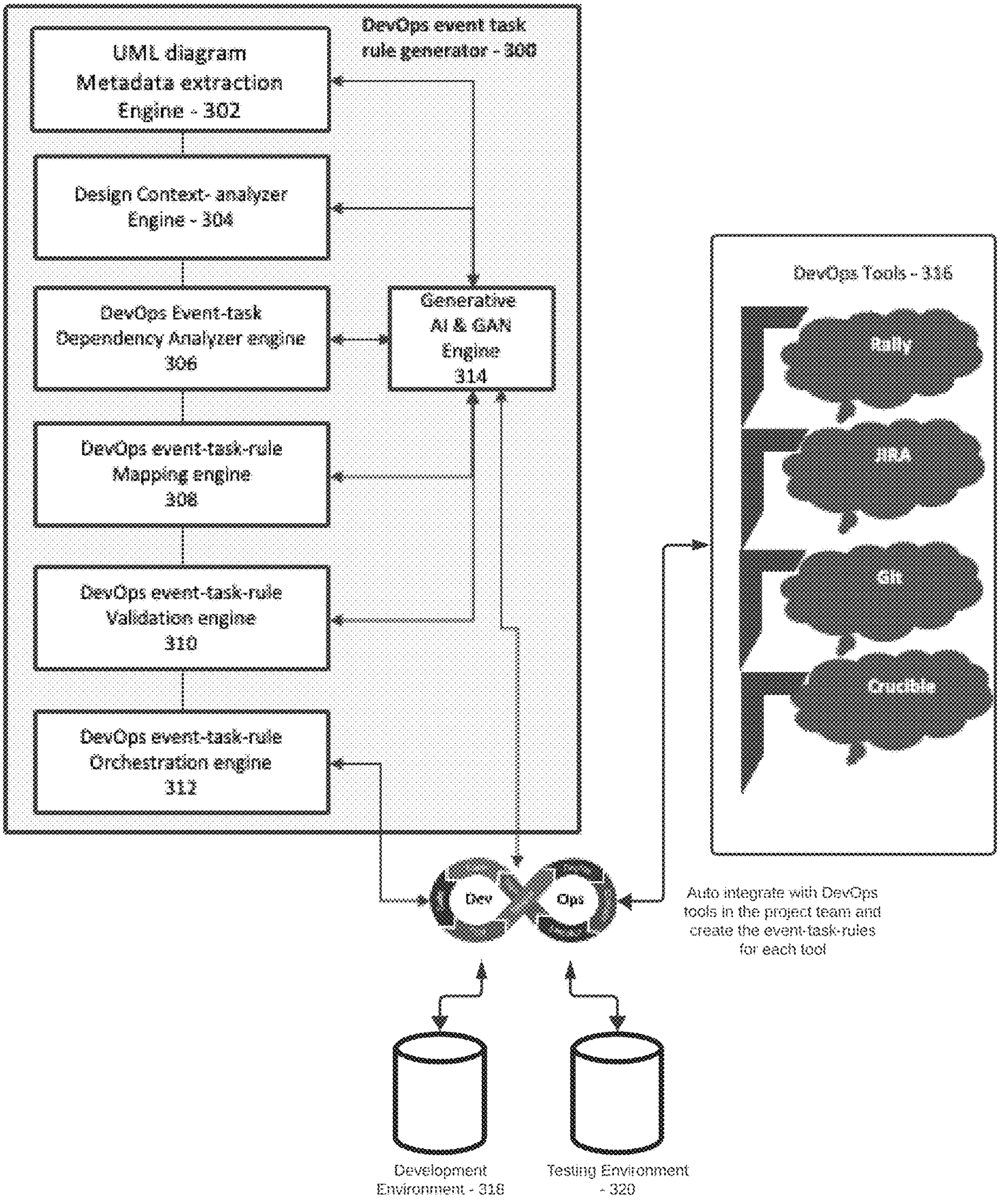
FIG. 3 depicts a functional architecture and flow diagram showing sample interactions, interfaces, steps, functions, and components of a system and process for creating and managing rules for event-driven tasks within a DevOps environment that integrates with various DevOps tools to automate processes and workflows in accordance with one or more aspects of this disclosure.

By way of non-limiting disclosure, FIG. 3 depicts a functional architecture and flow diagram showing sample interactions, interfaces, steps, functions, and components of a system and process for creating and managing rules for event-driven tasks within a DevOps environment that integrates with various DevOps tools to automate processes and workflows in accordance with one or more aspects of this disclosure. At a high level, this is a functional architecture and flow diagram for a system that creates and manages rules for event-driven tasks within a DevOps environment, integrating with various DevOps tools, comprising: (a) UML Diagram Metadata Extraction Engine for analyzing and extracting metadata from UML diagrams; (b) Design Context-Analyzer Engine for interpreting the context of the design from metadata; (c) DevOps Event-Task Dependency Analyzer Engine for analyzing task dependencies; (d) DevOps Event-Task-Rule Mapping Engine for defining rules for task triggers; (e) Validation and Orchestration Engines for validating and automating the execution of tasks; (f) Generative AI & GAN Engine for rule generation and optimization; and (g) Integration with various DevOps tools and development/testing environments.

The architecture depicted in FIG. 3 is designed to create and manage rules for event-driven tasks within a DevOps environment. It integrates with various DevOps tools to automate processes and workflows.

Set forth below is breakdown of the components of the DevOps event task rule generator 300.

UML Diagram Metadata Extraction Engine 302 analyzes Unified Modeling Language (UML) diagrams (or the like) to extract metadata. UML diagrams are used to visually represent the design of a system, and extracting metadata from them can help in understanding the system's components and their relationships.

Design Context-Analyzer Engine 304 interprets the context of the design, using the metadata extracted from the UML diagrams or separately provided. Understanding the context is crucial for creating relevant and effective rules for automation.

DevOps Event-Task Dependency Analyzer Engine 306 analyzes the dependencies between various tasks in the DevOps workflow. For example, it can look at which tasks need to be completed before others can start, which tasks can run in parallel, etc.

DevOps Event-Task-Rule Mapping Engine 308 can, after the dependencies are analyzed, maps out the rules for when and how tasks should be triggered in response to different events in the DevOps lifecycle.

DevOps Event-Task-Rule Validation Engine 310 validates the rules to ensure that they are correct and will function as expected when implemented.

DevOps Event-Task-Rule Orchestration Engine 312 is where the actual automation takes place. The orchestration engine uses the validated rules to manage the workflow, coordinating the execution of tasks according to the defined rules and dependencies.

Generative AI & GAN Engine 314 uses artificial intelligence, specifically Generative Adversarial Networks, to generate new rules or optimize existing ones. GANs are a class of AI algorithms used in unsupervised machine learning, implemented by a system of two neural networks contesting with each other in a zero-sum game framework. Intercommunication is provided to exchange information between the foregoing modules, components, and engines, and adapt based on AI analysis.

Separately, DevOps tools integration is provided in 316. The architecture can integrate with various DevOps tools such as, for example, Rally, JIRA (for issue tracking and project management), Git (for version control), and Crucible (for code review). The integration allows for seamless synchronization of tasks, issues, code changes, and code quality reviews within the DevOps workflow. This allows for auto integration with DevOps tools in the project team and to create event-task-rules for each tool.

Development 318 and Testing Environments 320 are also provided. These are the environments where software development and testing take place. The architecture has provisions to handle events and tasks specific to these environments.

The overarching goal of the architecture is to provide an automated, intelligent system that can generate and manage task rules within a DevOps environment, enhancing efficiency and reducing the need for manual intervention. It is designed to be user-friendly and to integrate smoothly with existing DevOps tools, with a high level of adaptability to different project teams and workflows.

In sum, the problem of current DevOps workflows involving manual setup and configuration of environments, tasks, and access management, which is time-consuming and error-prone, is overcome by systems and methods disclosed herein that, inter alia, use AI to analyze UML/design diagrams (as well as metadata), which serve as blueprints for development activities. By interpreting the components and relationships depicted in the diagrams, the system automatically triggers relevant events within the DevOps environment.

It is accomplished by, inter alia, (a) Image recognition: Extracts information from UML diagrams, including components, relationships, and dependencies; (b) Generative Adversarial Neural Network (GAN): Learns through iterative training to map diagram elements to relevant DevOps events and tasks; (c) Metadata parsing: Analyzes additional information like diagram author, creation date, and version to ensure context and validity; and (d) DevOps tool integration: Generates tasks and events compatible with various existing DevOps tools. Overall, this foregoing automates and optimizes distributed DevOps workflows by leveraging the power of AI and computer vision.

Figure 4:
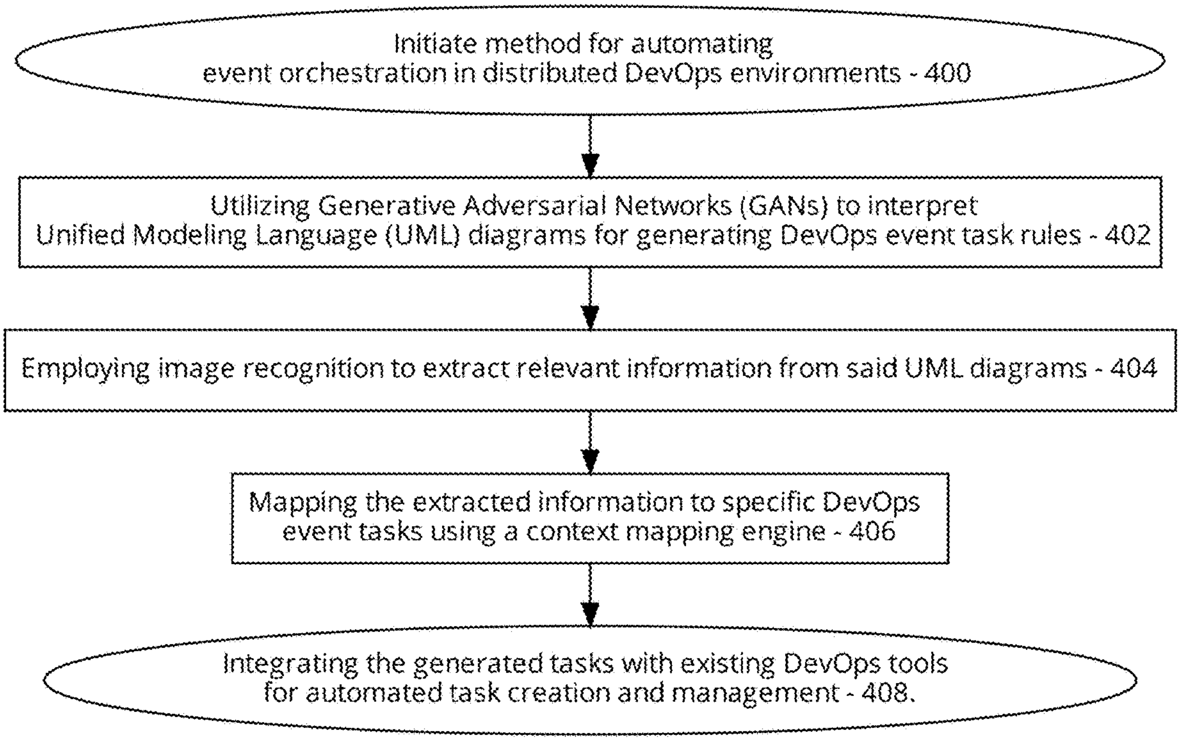
FIG. 4 depicts another functional flow diagram showing sample interactions, interfaces, steps, and functions in accordance with one or more aspects of this disclosure.

By way of non-limiting disclosure, FIG. 4 depicts another functional flow diagram showing sample interactions, interfaces, steps, and functions in accordance with one or more aspects of this disclosure.

In 400, a method for automating event orchestration in distributed DevOps environments is initiated. Utilizing Generative Adversarial Networks (GANs) to interpret Unified Modeling Language (UML) diagrams (or other design diagrams) for generating DevOps event task rules is performed in 402. Employing image recognition to extract relevant information from said UML diagrams is implemented in 404. Mapping the extracted information to specific DevOps event tasks using a context mapping engine is performed in 406. Integrating the generated tasks with existing DevOps tools for automated task creation and management occurs in 408.

One or more various other non-depicted steps or additional functions may include one or more of the following: 1. Generating/extracting/parsing metadata (or potentially preexisting metadata) from UML or other drawings or documents. 2. Continuously updating the GANs based on feedback from the execution of generated tasks to improve rule generation accuracy. 3. Using, in the image recognition, natural language processing techniques for extracting textual information from UML diagrams. 4. Deploying the generated tasks across multiple DevOps tools for automated event execution. 5. Utilizing, in the context mapping engine, historical data from previous DevOps tasks to enhance task mapping accuracy. 6. Analyzing dependencies between tasks to optimize task sequencing and resource allocation. 7. Including, in conjunction with the integration with DevOps tools, configuring automated testing environments. 8. Including real-time monitoring and adjustment of DevOps workflows based on generated event tasks. 9. Configuring the GANs to generate predictive models for simulating the impact of proposed DevOps tasks. 10. Customizing the generated DevOps tasks based on specific project requirements. 11. Adapting the image recognition process to recognize and interpret various types of UML diagrams, including structural and behavioral diagrams. 12. Including an automated notification system for updating stakeholders about task status and workflow changes. 13. Utilizing a cloud-based platform to facilitate distributed DevOps team collaboration. 14. Using meta-learning techniques to enable the GANs to adapt to evolving DevOps practices and technologies. 15. Including a security and/or compliance check for each generated DevOps task. 16. Integrating with an automated environment setup for production and development. 17. Generating documentation for created tasks and workflows. 18. Automatically scaling resources based on the complexity and demands of the generated tasks. 19. Utilizing a feedback loop mechanism where the outcomes of task executions are used to refine future task generation and mapping.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for automating event orchestration in distributed DevOps environments comprising the steps of:

employing image recognition to extract metadata from Unified Modeling Language (UML) diagrams;

utilizing an Artificial Intelligence (AI)-Generative Adversarial Network (GAN) engine to interpret the UML diagrams for generating DevOps event task rules;

mapping the metadata that was extracted to specific DevOps event tasks using a context mapping engine;

integrating the DevOps event task rules that were generated with existing DevOps tools for automated task creation and management;

selecting, by the AI-GAN engine, a main branch that holds source code that reflects a current state of a product in production;

creating, by the AI-GAN engine, a feature branch from the main branch that allows developers to work on new features without disturbing a main code base;

generating, by the AI-GAN engine, a naming convention for continuous integration (CI) branches to identify a purpose of software branches and organize workflow;

generating, by the AI-GAN engine, CI/continuous development (CD) pipeline rules that trigger a CI/CD pipeline when changes are pushed to the CI branches to enable new code commits to be built and tested without manual intervention;

triggering, by the AI-GAN engine, when the CI/CD pipeline rules are met, automated testing tasks to verify that the new code commits do not break any existing functionality;

performing, by the AI-GAN engine, automatic validation on the new code commits;

generating, by the AI-GAN engine, notifications based on auto-configure trigger rules;

merging, by the AI-GAN engine, the feature branch to the main branch once the new code commits pass all checks;

resolving, by the AI-GAN engine, any merge conflicts between the feature branch and the main branch; and executing, by the AI-GAN engine, an autodelete task to delete the feature branch.

2. The method of claim 1, further comprising continuously updating the AI-GAN engine based on feedback from execution of generated tasks to improve rule generation accuracy.

3. The method of claim 2 wherein the image recognition includes natural language processing techniques for extracting textual information from UML diagrams.

4. The method of claim 3 further comprising the step of deploying the generated tasks across multiple DevOps tools for automated event execution.

5. The method of claim 4, wherein the context mapping engine utilizes historical data from previous DevOps tasks to enhance task mapping accuracy.

6. The method of claim 5 further comprising the step of analyzing task dependencies to optimize task sequencing and resource allocation.

7. The method of claim 6 further comprising integration with DevOps tools to enable configuring automated testing environments.

8. The method of claim 7 further comprising the step of performing real-time monitoring and adjustment of DevOps workflows based on generated event tasks.

9. The method of claim 8, wherein the AI-GAN engine is configured to generate predictive models for simulating impact of proposed DevOps tasks.

10. The method of claim 9, wherein the image recognition is adapted to recognize and interpret various types of said UML diagrams, including structural UML diagrams and behavioral UML diagrams.

11. The method of claim 10, further comprising the step of automatically notifying stakeholders about task status and workflow changes.

12. The method of claim 11, wherein the method is implemented on a cloud-based platform to facilitate distributed DevOps team collaboration.

13. The method of claim 12 further comprising the step of utilizing meta-learning techniques to enable the AI-GAN engine to adapt to evolving DevOps practices and technologies.

14. The method of claim 13, wherein the context mapping engine is capable of handling multi-language UML diagrams.

15. The method of claim 14 further comprising the step of performing a security and compliance check for each generated DevOps task.

16. The method of claim 15 further comprising the step of integrating with existing DevOps tools that include automated environment setup for production and development.

17. The method of claim 16 further comprising the step of generating documentation for each of said generated DevOps task.

* * * * *